United States Patent [19]
Umemura et al.

[11] Patent Number: 5,341,648
[45] Date of Patent: Aug. 30, 1994

[54] PROCESS FOR PRODUCING ICES

[75] Inventors: Shin-ichi Umemura; Sadao Yashiro, both of Yokohama, Japan

[73] Assignee: Morinaga & Co., Ltd., Tokyo, Japan

[21] Appl. No.: 24,677

[22] Filed: Mar. 1, 1993

[30] Foreign Application Priority Data

Mar. 6, 1992 [JP] Japan .................................. 4-084771

[51] Int. Cl.⁵ .............................................. F25C 5/10
[52] U.S. Cl. .............................................. 62/73; 62/1; 62/320; 426/66; 426/524
[58] Field of Search ................ 62/1, 73, 74, 320, 347; 426/66, 526

[56] References Cited

U.S. PATENT DOCUMENTS

| | | | |
|---|---|---|---|
| 3,003,327 | 10/1961 | Cox | 62/320 X |
| 3,190,083 | 6/1965 | Miller | 62/320 X |
| 3,619,205 | 11/1971 | LeVan et al. | 62/1 X |
| 4,547,076 | 10/1985 | Maurer | 62/320 X |

*Primary Examiner*—William E. Tapolcal
*Attorney, Agent, or Firm*—Frishauf, Holtz, Goodman & Woodward

[57] ABSTRACT

A process for producing an ice, comprising the steps of allowing a material solution containing a sweetener to flow downward from the upper part of and along the surface of a freezing plate provided substantially upright, to thereby cause the material solution to freeze on and stick to the surface of the freezing plate to form an ice plate; breaking the ice place into ice pieces having a diameter of about 20 mm at maximum; and filling a container with the ice pieces. The material solution is so controlled as to flow down in such a quantity that at least 30% of the solution freezes on and sticks to the freezing plate before the solution reaches the lower end thereof, and has a concentration so adjusted that the ice plate has a fragmentation resistance of 1,000 mm or less as measured by the dropping test method.

1 Claim, 1 Drawing Sheet

PROCESS FOR PRODUCING ICES

BACKGROUND OF THE INVENTION

1. Field of the Invention

This invention relates to ices (a frozen dessert made of sweetened water and/or fruit juice) comprising ice divided into minute granular pieces. More particularly, it is concerned with ices such as frappes having excellent flavor, allowing to enjoy crispy light sensation when eating.

2. Description of the Prior Art

There are a number of frappes in the prior art with different preparation methods and characteristics, as described below.

A frappe which is shaved ice with syrup is prepared by shaving ice into a soft mass by means of an ice scraper having a blade like that of a plane and then adding syrup to the mass in a cup. This is prepared by shaving ice at the time of eating.

Other frappe type ices called chipped ice (or "mizore" in Japan) are comprised of ice minutely chipped, and with which a cup is loosely filled together with syrup. This can be mass-produced, and is prepared by chipping or cracking a relatively large lump of ice by means of a crusher or the like and mixing the chipped product with syrup. The large lump of ice used on that occasion is produced by freezing water put in a large freezing drum for ice manufacture the outside of which is usually cooled by a refrigerant. Ice prepared using a freezing plate or freezing drum may also be used.

Ice pieces called cracked ice or broken ice are also known and are prepared by cracking or breaking a large lump of ice into pieces.

A frappe is served at a store by shaving ice upon request from customers. Since the ice may immediately melt when a cup is filled with it, it has been impractical to mass produce this frappe ahead of time.

When the ices called "chipped ice" are mass-produced, containers such as cups are filled with chipped ice together with syrup, and the resulting products are stored under refrigeration. It is indispensable for such products to provide a light sensation such that granular pieces of ice (or ice grains) crisply break in a mouth when eating. Since, however, the products having been stored under refrigeration become solid and hard together with syrup, they can not be eaten with ease immediately after they are taken out of a storage container, unless they have been left to stand for a while so that the syrup melts to make the whole soft. In addition, a slight temperature rise during manufacture or storage may cause the granular pieces of ice to partly melt at their surfaces coming into contact with the syrup, because of a difference in freezing points. If such partly molten ices are again frozen for further storage, they become harder products.

The ice pieces called cracked ice or broken ice, prepared by simply cracking or breaking a lump of ice into pieces, are relatively large ice pieces with such a size that a single piece thereof can be mouthed with difficulty. Hence, they can not be easily crushed with the teeth in a mouth. Moreover, since they are comprised of ice itself, they have no taste, and have little flavor even if broken into minute pieces.

When a material solution containing a sweetener is put in a freezing drum and frozen to prepare a usual lump of ice, the material solution begins to freeze at the outer portions which are in contact with the inner wall of the freezing drum and continues to freeze toward the center. In this course, components dissolved in the material solution do not freeze together with the ice and mostly remains in the material solution at its portion having not yet been frozen. Hence, as the freezing proceeds, the components dissolved in the material solution accumalate in the center and become concentrated there. It therefore has been impossible to flavor the ice uniformly as a whole. As a result, when the ice thus obtained is fragmented, it has been impossible to obtain ice grains uniformly flavored.

As frozen products with a uniform flavor as a whole, for example, flavored ices called Popsicle are known. These are produced by freezing in a domestic-purpose freezing pan or small-sized freezing tube a material solution containing a sweetener and so forth. When, however, the material solution freezes, only the ice freezes as in the case of the production of a large lump of ice, and the dissolved components such as a sweetener become concentrated. Since, however, the freezing tube is small, the whole can freeze in a short time, so that the portions containing dissolved components become dispersed in the ice in the form of minute liquid droplets. This is a state in which concentrated syrup is enclosed in pores in ice, and a sensation uniform as a whole is produced when eating. Such a frozen product, however, is not transparent as is seen in Popsicle and can be easily crushed with the teeth, giving no crispy light sensation inherent in ice when eating.

SUMMARY OF THE INVENTION

Accordingly, an object of the present invention is to provide a process for producing an ice that can be free from the disadvantages stated above, has a crispy light sensation when eating and flavor such as sweetness, and does not become hard as a whole even after storage in a storage container.

To achieve the above object, the present invention provides a process for producing an ice, comprising the steps of;

allowing a material solution containing a sweetener to flow downward from the upper part of and along the surface of a freezing plate provided substantially upright, to thereby cause said material solution to freeze on and stick to the surface of said freezing plate and form an ice plate;

breaking said ice place into ice pieces having a diameter of about 20 mm at maximum; and filling a container with said ice pieces;

said material solution being so controlled as to flow down in such a quantity that at least 30% of the solution freezes on and sticks to said freezing plate before the solution reaches the lower end thereof; and said material solution having a concentration so adjusted that said ice plate has a fragmentation resistance of 1,000 mm or less as measured by the dropping test method.

According to the process of the present invention, the freezing plate is provided substantially upright and the material solution is allowed to flow downwardly from the upper part of and along the surface of the freezing plate, and the material solution is so controlled as to flow down in such a quantity that at least 30% of the solution freezes on and sticks to the freezing plate before the solution reaches the lower end of the plate. Hence, the material solution rapidly freezes while it flows down along the freezing plate, so that the frozen product thus obtained can be free from any local differences in concentration of sweeteners, providing an ice plate compositionally uniform as a whole. Thus, the fragments obtained by breaking it into pieces have the same flavor for every fragments.

In ices obtained by the process of the present invention, the sweeteners are imparted to each grain of ice, and hence it is unnecessary to add syrup or the like to the granular pieces of ice to flavor them. Since no syrup is added, the whole do not become hard even when stored under freezing. Thus, the ices can be eaten immediately after they are taken out of a storage container. Moreover, since the granular pieces of ice are not in contact with syrup having a large sugar concentration, the melting point is not affected and the ices can be stably stored for a long period of time.

In addition, according to the process of the present invention, the material solution used has a concentration so adjusted that the ice plate has a fragmentation resistance of 1,000 mm or less as measured by the dropping test method. Hence, a crispy light sensation when eating and a feeling of glittery ice can be achieved.

DESCRIPTION OF THE PREFERRED EMBODIMENTS

Figure 1:
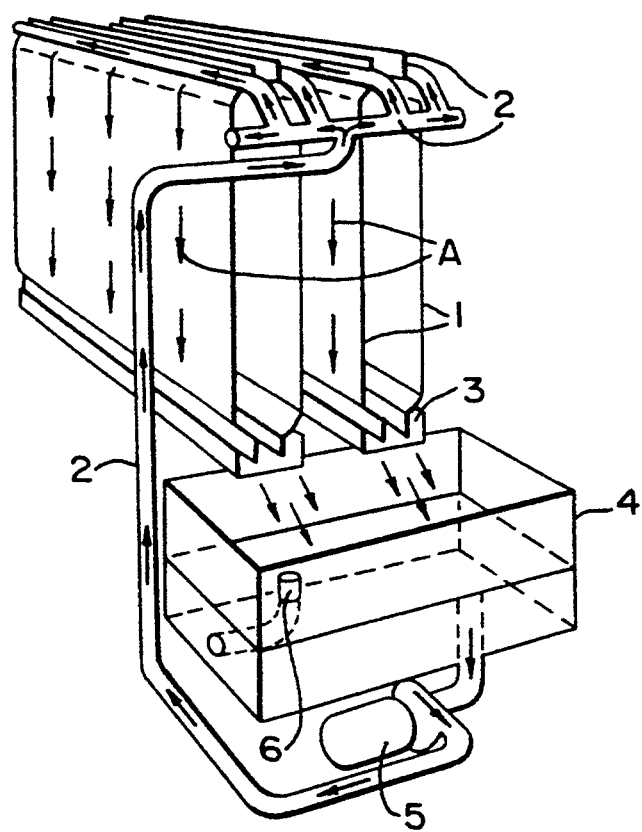
FIG. 1 is a schematic perspective illustration of a freezing apparatus used in the present invention.

In the present invention, the material solution containing a sweetener is a solution comprising water to which a sweetener such as a saccharide, stevioside or a synthetic artificial sweetener called Aspartame (trademark; available from Searle, G.D., & Co.) and other components have been added. The saccharide may include sugar, glucose, maltose, fructose, a glucose-fructose mixed liquid sugar, and starch syrup. This solution must have a concentration so adjusted that an ice plate has a hardness corresponding to a fragmentation resistance of 1,000 mm or less, and preferably from 200 mm to 800 mm as measured by the dropping test method, the method described later in Test Example. This concentration corresponds to a Brix degree of 8 or less when a disaccharide such as sugar is used in the solution, or a Brix degree of 4.5 or less when a monosaccharide such as glucose is used. Accordingly, when the sweetness is not enough, a sweetener with a high sweetness as exemplified by stevioside or Aspartame should be used so that products having the desired sweetness can be obtained.

Experiments made by the present inventors have revealed that, as reported later in Test Example, the fragmentation resistance of the ice unexpectedly increases with an increase in the concentration of sweeteners in the material solution. Before the experiments, it has been surmised that a solution containing sweeteners in a larger concentration has a lower freezing point and freezes at a lower temperature to form a relatively soft ice, which more easily breaks than ice solution having a smaller concentration, so that the fragmentation resistance decreases.

However, measurement actually made has revealed that the fragmentation resistance of ice decreases when sweeteners are in a smaller concentration, giving an ice that can easily break in a mouth and has a crispy light sensation when eating, and on the other hand the fragmentation resistance of ice increases when a material solution contains sweeteners in a larger concentration, producing an ice that has no light sensation when eating, can not easily break and has a soft sensation when eating.

The material solution containing a sweetener and other components is allowed to flow downwardly from the upper part of and along the surface of a freezing plate provided substantially upright, to thereby cause the material solution to freeze on and stick to the surface of the freezing plate to form an ice plate. At this time, the material solution must be so controlled as to flow down in such a quantity that at least 30%, and preferably from 50% to 100%, of the solution freezes on and sticks to the freezing plate before the solution reaches the lower end of the plate. Thus, the material solution rapidly freezes while it flows down along the freezing plate, without concentration of sweeteners in the material solution, that is, the material solution containing sweeteners in a uniform concentration frozen as it is. Hence the freezed product thus obtained can be free from any local differences in concentration of sweeteners, providing an ice compositionally uniform as a whole. As for the material solution having flowed down from the lower end of the freezing plate, it may be fed back to a reservoir for the material solution so that it can be reused.

In the present invention, the freezing plate must be so provided that the material solution can flow along it downward from above. That is, in the present invention, what is meant by "a freezing plate provided substantially upright" is that the freezing plate is so provided that the material solution can flow down in contact with the surface of the freezing plate when it is allowed to flow downward from above, and is not necessarily that the freezing plate must be provided vertically in a physically exact meaning. It may be provided inclinedly to a certain extent so long as the object of the present invention can be achieved.

FIG. 1 schematically illustrates a known freezing apparatus preferably used in the working of the present invention, having the freezing plate as described herein.

As shown in FIG. 1, freezing plates 1 are provided in two pairs and in parallel in substantially the vertical direction. Refrigerating pipes (not shown) are provided inside the two pairs of freezing plates 1, and a refrigerant flowing through the pipes lowers the temperature of the freezing plates. When brine is used as a refrigerant, the temperature of brine at the outlet of each refrigerating pipe on the inside wall of the freezing plate may preferably be so controlled as to be not higher than the freezing temperature of the material solution, and more preferably −5° C. or below. At the outside of the two pairs of freezing plates 1, a pipe 2 is provided to supply the material solution to the freezing plates 1. As shown by arrows A in the drawing, the material solution is so made as to flow out from above and flow down along the outer walls of the freezing plates 1.

At the lower ends of the freezing plates, gutters 3 are provided so that the material solution having not been frozen falls in the gutters and is collected in a circulation tank 4. The unfrozen material solution recovered in the circulation tank 4 is recycled to the pipe 2 by means of a circulation pump 5 so that it is made to flow down from above along the outer walls of the freezing plates 1. To prevent the material solution in the circulation tank 4 from overflowing, an overflow pipe 6 is provided.

Thus, according to this freezing apparatus, the material solution containing a sweetener is made to flow out from above toward the outer walls of the freezing plates 1, whereupon the material solution flows down along the surfaces of the freezing plates 1, during which at least 30% of the solution freezes and sticks to the freezing plates 1. The material solution having not been frozen falls in the gutters 3 and is collected in the circulation tank 4 and again made to flow from the upper part of the freezing plates 1 through the pipe 2.

The material solution is continuously flowed down along the freezing plates until ice plates with a given thickness are formed on their surfaces. At this time, each ice plate should be formed in a thickness that may give a best efficiency taking account of the composition of the material solution, the hardness of the resulting ice plate and the power of the crusher used. It may preferably be in a thickness of from 10 mm to 35 mm.

Then the feeding of the material solution is stopped, and the freezing plates are heated so that the ice plates fall off. The resulting ice plates are broken by means of a crusher or the like into granular pieces having a diameter of about 20 mm at maximum, preferably diameters of from about 4 mm to about 19 mm, and more preferably from 4 to 10 mm, taking account of a good sensation when eating. Fragments of ice, obtained by breaking the ice plate into pieces, may be optionally sieved so that the granular pieces with a diameter of 20 mm at maximum can be obtained. Excessively large fragments of ice are likely to be difficult to crush with teeth in a mouth when eating.

The granular pieces may have different diameters.

After the ice plate has been broken into pieces in this way and the fragments have been optionally sieved to have the given size, containers such as cups are filled with the granular pieces and then covered, optionally followed by cooling to provide cups with ices comprising the granular pieces of ice.

EXAMPLES

The present invention will be described below in greater detail by giving Examples. In the following, "part(s)" refers to "part(s) by weight"

EXAMPLE 1

To 5.0 parts of orange juice, 3.0 parts of sugar, 0.5 part of citric acid, 0.1 part of aromatic and 0.05 part of Aspartame, water was added so as to be made up to 100 parts. A material solution was thus prepared. This material solution had a concentration corresponding to a Brix degree of 4.1. Using this material solution, an ice plate was prepared and its fragmentation resistance was measured according to the method described later in Test Example. As a result, the ice plate broke when a steel ball was dropped at a height of 530 mm.

The material solution was allowed to flow downward from the upper part of and along the surfaces of freezing plates provided vertically, and caused to freeze on and stick to the surfaces of the freezing plates to form ice plates. At this time, the material solution was so controlled as to flow at such a rate that about 60 to 70% of the material solution flowing down freezes before the solution reached the lower ends of the plates. Brine used as a refrigerant had temperatures of −10° to −20° C. at the outlets of refrigerating pipes on the inside walls of the freezing plates.

The freezing plates used were those as shown in FIG. 1, which were available from Tozai Kogyo K. K. as an automatic freezing system TURBO (trademark).

The material solution was made to continuously flow down along each freezing plate until an ice plate with a thickness of about 20 mm was formed on its surface, and then the feeding of the material solution was stopped. The resulting ice plates were broken by means of a crusher into granular pieces, which were then sieved. Those with diameters of greater than 20 mm were returned to the crusher, and again divided into minute pieces. Granular pieces with diameters of 20 mm at maximum were thus obtained. Cups for ices were filled with the granular pieces thus obtained, followed by storage overnight in a −30° C. refrigerator. Cups with ices comprising the granular pieces of ice were thus produced.

When the ices thus obtained were eaten, the granular pieces of ice crisply lightly broke in a mouth with an appropriate sweetness, giving a very pleasant feeling. The ices were further put in a storage container in a shop to carry out a storage test for 1 week in such a condition that a cover of the storage container was opened and shut 20 times a day. As a result, the granular pieces of ice in the cups did not bind or cohere to each other.

For comparison, the present Example was repeated except that Aspartame was replaced with 4 parts of sugar (it follows that 7 parts of sugar was used in total). In the case of cups with ices thus obtained, the ices gave no crispy light sensation in a mouth when crushed with teeth, but gave a soft sensation when eating, like Popsicle. Moreover, as a result of the storage test in the storage container, the granular pieces of ice cohered to each other to form a lump in each cup. This was due to the fact that the material solution obtained had such a concentration that the ice plate had a fragmentation resistance of 1,170 mm as measured by the dropping test method described later.

EXAMPLE 2

To 4.0 parts of sugar, 1.5 parts of instant coffee, 3.0 parts of glucose-fructose mixed liquid sugar, 0.04 part of stevioside and 0.1 part of aromatic, water was added so as to be made up to 100 parts. A material solution was thus prepared. This material solution had a concentration corresponding to a Brix degree of 7.8. Using this material solution, an ice plate was prepared and its fragmentation resistance was measured according to the method described later in Test Example. As a result, the ice plate broke when a steel ball was dropped at a height of 920 mm.

In the same manner as in Example 1, the material solution was caused to freeze using the freezing plates provided vertically and the resulting ice plates were broken by means of a crusher into granular pieces, which were then sieved to obtain granular pieces with diameters of 20 mm at maximum. Cups for ices were filled with the granular pieces thus obtained, followed by storage overnight in a −30° C. refrigerator. Cups with ices were thus produced.

When the ices thus obtained were eaten, the granular pieces of ice crisply lightly broke in a mouth with an appropriate sweetness, giving a very pleasant feeling. The ices were further put in a storage container in a shop to carry out a storage test for 1 week in such a condition that a cover of the storage container was opened and shut 20 times a day. As a result, the granular pieces of ice in the cups did not bind or cohere each other.

TEST EXAMPLE

Measurement of Fragmentation Resistance of ice (Dropping Test Method)

A material solution was put in a low cylindrical container with a diameter of 88 mm, which was left to stand overnight to produce an ice plate with a thickness of 10 mm. This ice plate was put on a stainless steel ring with a diameter of 76 mm, and a steel ball with a weight of 47 g was dropped at −20° C. and at varied height to measure the height when the ice plate first breaks (i.e., minimum drop distance). The value obtained is regarded as fragmentation resistance.

The amount of sugar added in the material solution was varied to produce material solutions with different concentrations. The fragmentation resistance of ice plates of the material solutions was measured to obtain the results as shown in Table 1.

TABLE 1

| Concentration of material solution (Brix degree) | Fragmentation resistance (mm) | Organoleptic test results (Total points) |
| --- | --- | --- |
| 0 | 30 | 50 |
| 2 | 265 | 50 |
| 4 | 500 | 50 |
| 6 | 735 | 48 |
| 8 | 970 | 45 |
| 10 | 1,200 | 30 |
| 12 | 1,435 | 25 |

The organoleptic test referred to in Table 1 was carried out by having 10 panelists eat the fragments of ice plates prepared by freezing each material solution according to the method of Example 1, and evaluated the sensation when eating according to the following five ranks. Results are indicated as total points thereof.

5: Great light sensation (a crispy light sensation when eating).
4: Between 5 and 3.
3: Medium light sensation (crispy, but lacking in lightness)
2: Between 3 and 2.
1: Little light sensation (a soft sensation when eating, like Popsicle).

What is claimed is:

1. A process for producing an ice, comprising the steps of:

allowing a material solution containing a sweetener to flow downward from the upper part of and along the surface of a freezing plate provided substantially upright, to thereby cause said material solution to freeze on and stick to the surface of said freezing plate to form an ice plate;

breaking said ice plate into ice pieces having a diameter of about 20 mm at maximum; and filling a container with said ice pieces;

said material solution being so controlled as to flow down in such a quantity that at least 30% of the solution freezes on and sticks to said freezing plate before the solution reaches the lower end thereof; and said material solution having a concentration so adjusted that said ice plate has a fragmentation resistance of 1,000 mm or less as measured by a dropping test method comprising the steps of putting the material in a low cylindrical container having a diameter of 88 mm and cooling over night to produce an ice plate with a thickness of 10 mm; putting the ice plate into a stainless steel ring with a diameter of 76 mm and, at a temperature of −20° C., dropping a 47 gram steel ball onto the plate from various heights, the fragmentation resistance being the minimum height at which the ball breaks the plate.

* * * * *